United States Patent [19]

Cholet et al.

[11] 4,278,982

[45] Jul. 14, 1981

[54] OPTICAL RECORDING DEVICE

[75] Inventors: Jacques Cholet, L'Etang-la-Ville; Bernard Damotte, Rueil-Malmaison; Jean Laurent, Morainvilliers, all of France

[73] Assignee: Institut Francais du Petrole, Rueil-Malmaison, France

[21] Appl. No.: 30,688

[22] Filed: Apr. 16, 1979

[30] Foreign Application Priority Data

Apr. 17, 1978 [FR] France .................................. 78 11462

[51] Int. Cl.³ .......................................... G01D 15/14
[52] U.S. Cl. ................... 346/108; 346/139 R
[58] Field of Search ................... 346/108, 110, 139 R, 346/33 C; 74/45; 358/292, 293, 302

[56] References Cited

U.S. PATENT DOCUMENTS

| | | | |
|---|---|---|---|
| 1,985,654 | 12/1934 | Finch | 346/33 R X |
| 3,389,403 | 6/1968 | Cottingham | 346/108 |
| 3,419,878 | 12/1968 | Maurer | 346/14 |
| 4,030,122 | 6/1977 | Chemelli | 346/76 L X |

FOREIGN PATENT DOCUMENTS

| | | | |
|---|---|---|---|
| 633527 | 8/1936 | Fed. Rep. of Germany | 346/117 A |
| 586508 | 12/1958 | Italy | 74/45 |

*Primary Examiner*—Joseph W. Hartary
*Attorney, Agent, or Firm*—Millen & White

[57] ABSTRACT

An optical recording device comprising a rigid arm carrying an optical system generating a light beam whose characteristics are varied in response and in relationship to a signal to be recorded. The arm is driven in an oscillatory movement by a motor of circular movement associated to a crank. The device further comprises a recording support unrolled along a direction orthogonal to that of the arm oscillatory movement, and means for synchronizing the control of the optical system with the movement of the arm.

9 Claims, 7 Drawing Figures

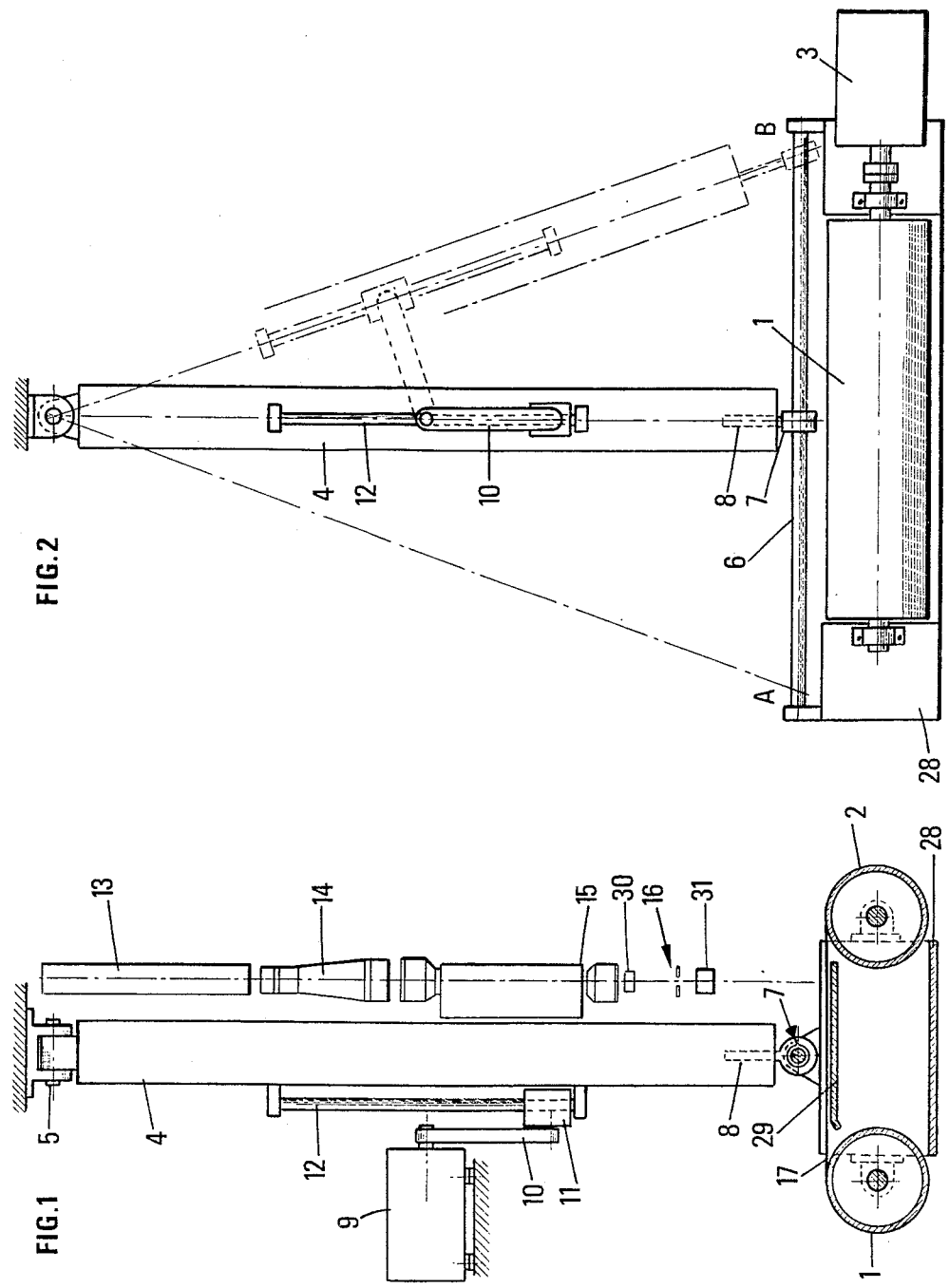

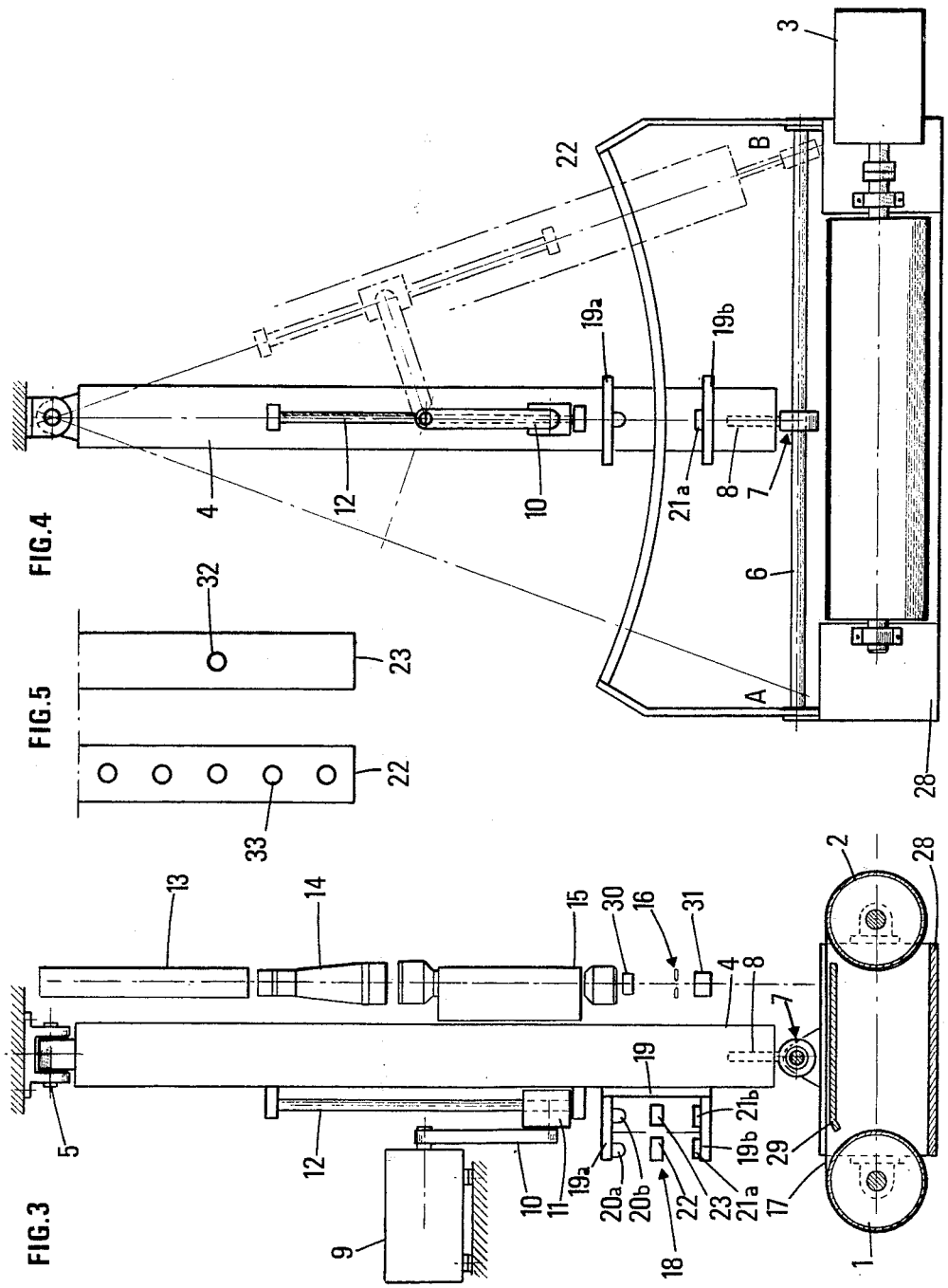

OPTICAL RECORDING DEVICE

BACKGROUND OF THE INVENTION

This invention relates to a device for recording data. More particularly this invention relates to an optical device for recording data related to seismic prospecting operations.

The data collected during such operations are now digitalized as soon as they are received and are recorded on magnetic tapes. In view of the necessity to represent the data in a readable document, there is used a recorder adapted to convert the digitalized data to visible traces and to arrange the traces so as to obtain a complete depth section of a seismic profile.

The transfer of the digitalized information into a visible form may be achieved in two different modes. According to the first mode, the information is transferred onto a paper support by means of a machine of the printing type and is converted to a plotting of variable area where the black portions are formed by the juxtaposition of printed points. However, these printed points have a finite minimum width, thereby limiting the frequency of the curves which can be represented.

According to the second mode, the information is transferred onto a sensitive support. The sensitive support may be, e.g., the screen of an oscilloscope whose beam deviation system is actuated by a control signal responsive to the signals to be recorded.

The sensitive support may also have the form of a support sensitive to light. It is sensitized by a light beam whose motion and/or intensity depends on the signals to be recorded.

A commonly used recording system comprises an element for generating a light beam, elements for imparting to the light beam an oscillatory motion and/or varying its intensity according to the selected type of recording (galvanometric, of variable area, of variable density or a combination thereof), a sensitive support attached to a revolving drum and means to shift the beam with respect to the support. The drum makes one revolution for each recording trace.

The disadvantage of this type of recorder consists essentially in the fact that the maximum number of traces which can be recorded is limited by the width of the sensitive support attached to the drum. When to seismic prospecting operations are conducted on a large scale, it is necessary, in order to represent seismic profiles of great length, to fractionate the optical recordings, the width of each recording depending on the length of the drum generatrix, and then to employ photo-assembly to reconstitute the seismic profile representation to its whole extent.

SUMMARY OF THE INVENTION

The device according to the invention provides an optical recording system adapted to represent a seismic profile of very large extent and free of the limitations from which the prior optical recording devices suffer.

The device comprises means for displacing a recording support along a first displacement direction a rigid arm pivotable about a rotation axis in a plane orthogonal to the first direction, and driving means for pivoting the arm about its rotation axis. The device further comprises an optical system secured to the rigid arm and adapted to generate a light beam varying in relation with a signal to be recorded. The driving means comprises a driving motor operating in a continuous circular motion and means for converting the circular motion of the motor to an alternative linear motion which is applied to the arm.

The optical device carried by the arm comprises, for example, a light source adapted to generate a light beam and means for varying the light beam in proportion to the signal to be recorded. The means for displacing the recording support comprises, for example, a reel assembly associated to a motor to move the recording support transversely with respect to the plane of displacement of the arm.

The construction of the device allows it continuously record, without interruption, a large number of seismic traces. Moreover, the device may comprise a monitoring system for synchronizing the control of the optical system with the displacement of the arm so as to obtain a more regular and precise recording of the information onto the recording support.

BRIEF DESCRIPTION OF THE DRAWINGS

Other characteristics and advantages of the device will become apparent from the following description of non-limitative embodiments of the device, illustrated by the accompanying drawings wherein:

FIG. 1 shows a lateral view with a partial cross-section of the first embodiment of the device;

FIG. 2 shows a front view of the embodiment of FIG. 1;

FIG. 3 shows a lateral view with a partial cross-section of a second embodiment of the system for detecting the arm position;

FIG. 4 shows a front view of the embodiment of FIG. 2;

FIG. 5 shows a partial view of two perforated bars used in the monitoring system of FIG. 3;

DETAILED DESCRIPTION

Figure 6:
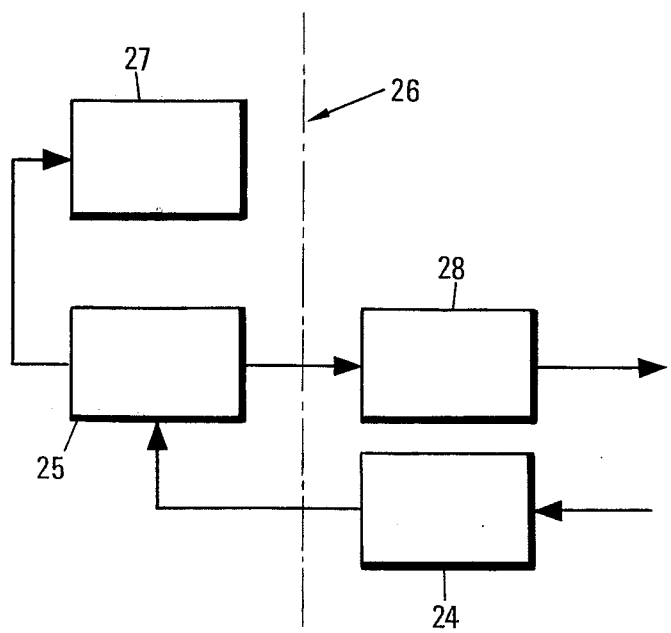
FIG. 6 diagrammatically shows an assembly of elements for picking up from a buffer-memory the information to be recorded, in synchronism with a pilot signal.

The device comprises (FIGS. 1 and 2) a system for moving a photosensitive recording support, consisting of a feeding reel 1 and a collecting reel 2, driven in rotation by motor means 3, consisting for example of a motor of the step-by-step type. The two reels 1 and 2 are arranged at a certain distance from each other and their axes are secured to a supporting structure 28. The device also comprises a rocking system consisting of an arm 4 pivotally mounted, at the first end thereof, about a stationary horizontal axis 5 and secured, at its second end, to guiding means adapted to maintain it in a vertical plane substantially perpendicular to the unrolling direction of the photosensitive recording support. The guiding means comprises, for example, a guiding bar 6 arranged parallelly to the generatrices of the reels 1 and 2 and passing through a ring 7 provided with a stem 8 slidably mounted in a housing of the arm 4.

The ring 7 is permanently guided along the bar 6 at any position of the arm 4 with respect to a vertical line.

The device further comprises driving means for imparting to the rocking arm 4 a pendular motion about its rotation axis 5. The driving means comprises, for example, a motor 9 equipped with a gear box and means for converting the torque of the motor to an alternating force which is imparted to the arm 4. The converting means comprises a crank 10 secured at a first end thereof to the arm of the gear box at the output of motor 9. At its second end, the crank 10 is secured to a ring 11 slidable along a rod 12 secured to the arm 4 and having the same longitudinal direction as the latter. When the crank 10 pivots, the ring 11 is subjected to an alternating motion along the rod 12 and imparts to the arm 4 a force having a horizontal component. As a result thereof the arm 4 is subjected to a pendular motion at a rate which, at any time, is dependent on the driving means and the geometry of the motion converting means.

The length of the crank 10 is selected in accordance with the location of its rotatation axis so that the stroke of the arm 4, at its lower end, is most equal to the width of the recording support 17. An optical system adapted to generate a variable light beam is secured to arm 4. The optical axis of this system is oriented substantially along the longitudinal direction of the arm 4. The optical system comprises a variable light source 13 consisting, for example, of a laser associated to a light modulator of a known type, whereby the light intensity can be varied in proportion to the amplitude of an electric signal applied thereto. This light modulator is used for variable density recordings.

The light beam produced by the light source 13 passes through a collimating lens 14 whereby the section of the light beam is varied while keeping it cylindrical, so as to improve the focusing. The light beam then passes through a deflector 15, also of a known type, adapted to deviate it proportionally to a control electric signal consisting, in the present case, of the signal to be recorded. The deflector is used for obtaining galvanometric recordings when it is actuated by the control signal alone and variable area recordings when the signal is superimposed onto a high frequency carrier.

The beam issued from deflector 15 passes through a cylindrical optical element 30 which focuses it in a plane, then through an adjustable slit 16 parallel to this plane. The slit 16 is only used for variable density or area recordings. The beam issued from the slit 16 then passes through an optical element 31 which makes it again cylindrical and then produces an image on a sensitized recording support 17 stretched between the reels 1 and 2 on a plate 29. The defocussing of the beam through optical element 31 is necessary in the case where the reels are cylindrical and where the distance between the optical system and the recording plane varies during the rocking motion of the arm 4.

It is however possible to omit the optical element 31 when making use of a movable assembly of the recording support comprising two reels having a curved generatrix whose curvature center is the rotation axis 5 of the pivotable arm 4. The plate 29 is given an identical curvature and the recording support is pressed against it by any known method. The plate 29 is, for example, perforated with holes through which suction is applied to retain the recording support.

The electric control signals of the variable light source 13 and/or deflector 15 are obtained either from a seismic data receiver or from a buffer-memory, not shown.

The device is operated in the following manner:

The sensitive recording support 17 being fixed in position, the motor means 9 is actuated for imparting to the arm 4 a pendular motion. The light beam, suitably modulated by the signal to be recorded, scans the sensitive support transversally to its direction of motion. Then, the motor 3 is actuated to shift by one step the photosensitive recording support. A new trace may be recorded alongside of the preceding one during the following pendular motion.

Several operating modes are possible:

(a) the device may be used for the direct representation of seismic data. The actuation of motor 9 imparts to the arm 4 a rocking motion whose period is adapted to that of the seismic shots performed on the field. The recordings are effected during each half period when the arm 4 is displaced, for example from A to B. After recording of one trace, the arm comes back to its initial position after the time interval separating two successive "shots".

(b) the seismic information may also be pre-recorded on a buffer-memory and then picked up at a rate adapted to that of the displacement of the arm 4. Irrespective of the driving rate of the latter, the time scale may also be adjusted so as to obtain traces of a predetermined length.

In the case where the seismic information transitionally passes through a buffer-memory, two recording methods are possible. According to the first one, the sensitive support 17 is sensitized by the information issued from the buffer-memory only during a half-period of oscillation of the arm (from A to B for example). According to the second one, the two half periods of the arm oscillation are used for recording the seismic information onto the sensitive support. In the direction from A to B, data are picked up from the memory in a chronological order. In the direction from B to A, the data corresponding to the adjacent seismic trace are picked up from the buffer-memory while reversing the reading order, the last data recorded in the buffer-memory being the first to be read and recorded on the sensitive recording support.

In the embodiment of FIGS. 3, 4, 5 and 6, the above-described device further comprises a monitoring system which can be used in all cases of deferred recording for picking up the information previously recorded on a buffer-memory, in synchronism with the motion of the arm 4. The monitoring system first comprises an assembly 18 for detecting the position of the arm 4. This assembly comprises a yoke 19 secured to the movable arm 4 and provided with two opposite plates 19a and 19b. On plate 19a are secured two light sources 20a, 20b, respectively facing two light sensors 21a, 21b arranged on plate 19b. These sensors consist, for example, of photo-electric cells.

Between the light source 20a and the sensor 21a is arranged a first elongate and opaque bar 22, secured to the supporting structure 28 and having a large number of punched holes 33 distributed over its whole length (FIG. 5).

The bar 22 is arranged along an arc of a circle so as to be at a substantially constant distance from the light source 20a. When the arm 4 moves between its two limit positions, the sensor 21a receives a number of light pulses equal to the number of holes punched in the bar 22. The period of these pulses depends on the speed of motion of arm 4 and each of them corresponds to a particular position of the latter.

Between the light source 20b and the light sensor 21b is placed a second elongate opaque bar 23 having two punched holes 32. It is also secured to the supporting structure 28 (FIGS. 4 and 5) and is curved in the same manner as the bar 22. The position of the two holes 32 is so selected on the bar that the sensor 21b receives a light pulse at each time when the recording light beam issued from the collimating lens 16 passes in the vicinity of the two edges of the recording tape.

The electric pulses produced by the light sensors are directed towards a piloting member 24 which generates a train of pulses of a total duration equal to the scanning period of the recording light beam between the positions defined by the two end holes 32 of the second bar 23 and which comprises a number of pulses equal to the number of holes 33 of the first bar 22.

The pilot signal generated by the piloting element 24 (FIG. 6) is fed to an interface element 25 of a computer 26 to pilot the sequential picking up of the information to be recorded. The interface element 25 comprises an internal register connected to a buffer-memory 27, internal to the computer 26. The interface element 25 is also connected to a digital-to-analog decoder 28 of a known type, outside the computer. The decoder 28 produces analog signals from the information picked up in the buffer-memory through the interface element. These analog signals are conveyed to the optical system through a cable, not shown.

The device operates as follows:

When the internal register of the interface element 25 is empty, the latter generates an actuation signal. This signal has the effect of producing the transfer of the information stored at a particular address in the memory 27 into an internal register of the interface element 25 at an instant defined by the internal clock of the computer 26. As soon as the interface element 25 receives a pulse issued from the piloting element 24, i.e. during the passage of one of the holes 33 of the bar 22 in the light beam of the light source 20a, it transfers to the decoder 28 the information contained in its internal register and issued from the buffer-memory 27.

The reception of the pilot-signal, constituted by the assembly of the pulses of the pilot-signal, produces the successive transfers, to the interface element 25 and then to the decoder 28, of the information stored at a series of determined addresses of memory 27.

The analog signals transferred from decoder 28 to the optical system are successively recorded on the sensitive recording support and form a seismic trace.

Figure 7:
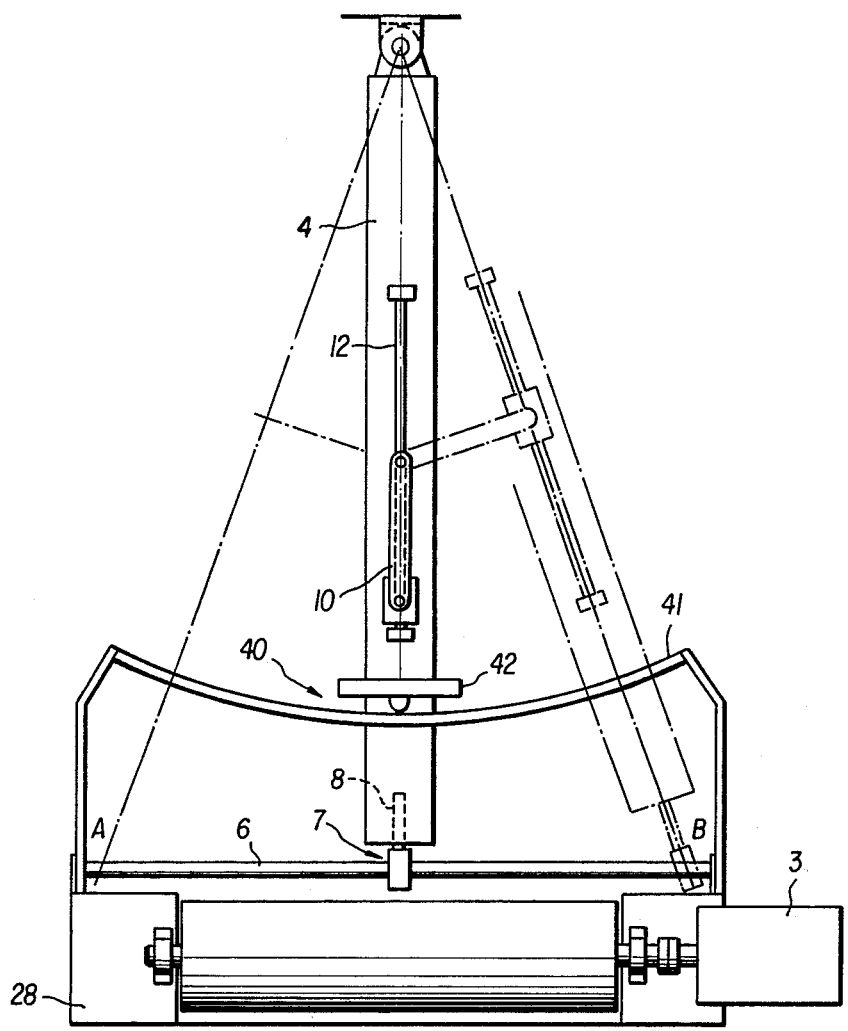
FIG. 7 shows a front view of an alternative embodiment using a magnetic track and reader.

The assembly 40 (FIG. 7) the arm position detection may also consist of a stationary support 41 on which is arranged at least one magnetic track where is preliminarily recorded a signal of the pulse type, for example, and a reading assembly 42, secured to the arm, adapted to generate an electrical signal whose frequency depends on the speed of motion of the arm.

What we claim is:

1. An optical recording device suitable for continuously recording a large number of seismic traces, comprising:
   means for displacing a horizontal photosensitive recording support in a first displacement direction;
   a rigid arm mounted on and pivotable about a fixed horizontal axis located above said recording support and parallel to said first displacement direction, driving means for imparting to said rigid arm an oscillatory pendular motion about its axis, and guide means adapted to confine the pendular motion of the arm to a vertical plane substantially perpendicular to said first displacement direction;
   an optical system secured to said rigid arm and oriented substantially along the longitudinal direction thereof, said optical system being adapted to generate a variable light beam; and
   a monitoring system for synchronizing the control of said optical system with the pendular motion of said rigid arm, comprising a detection assembly secured to said rigid arm and adapted to transmit a periodic electrical signal whose period is a function of the rate of the displacement of said arm, and control means for introducing data to be recorded into said optical system with a recurrence period depending upon that of the electrical signal generated by said detection assembly.

2. A device according to claim 1, wherein said optical system comprises a light source adapted to provide a light beam, and means for varying the characteristics of the light beam in relation to data to be recorded comprising a light modulator for varying the beam intensity, a collimating lens for varying the beam cross-section and a deflector for displacing the beam.

3. A device according to claim 1, wherein said driving means for imparting pendular motion to said rigid arm comprises a motor adapted to generate continuous circular motion, a rod secured to said rigid arm and along the longitudinal direction thereof, and a crank secured at one end to the shaft of said motor and at its other end to a ring adapted to slide along said rod.

4. A device according to claim 1, wherein said detection assembly comprises at least one paired light source and light detector secured to said rigid arm, and an optical coupling element stationary with respect to said arm for optically coupling said source to said detector at predetermined positions of said arm.

5. A device according to claim 4, wherein said optical coupling element comprises a first arcuate opaque bar perforated with a plurality of spaced holes, said bar being located between said source and said detector, the curvature of said arcuate bar being such that each of said holes is at a substantially constant distance from said light source.

6. A device according to claim 5, wherein said detection assembly further comprises a second paired light source and light detector secured to said rigid arm and a second fixed arcuate opaque bar located between said second paired source and detector and perforated by two holes, the positions of said holes being such that said second detector receives a light pulse from its paired source when said variable light beam reaches the vicinity of each of the two edges of said recording support.

7. A device according to claim 6, wherein said detection assembly further comprises a piloting member adapted to generate a train of pulses of a total duration equal to the scanning period of said variable light beam between the positions defined by the two holes in said second arcuate bar, the number of pulses in said train being equal to the number of holes in said first arcuate bar.

8. A device according to claim 1, wherein said detection assembly comprises a stationary arcuate support carrying a magnetic track on which is recorded a periodic signal and magnetic reading means secured to said rigid arm and adapted to read said periodic signal.

9. A device according to claim 1, wherein said control assembly comprises a buffer-memory containing data to be recorded, a digital-to-analog decoder and an element for sequentially picking up from the buffer-memory the data to be recorded, said element comprising a control input for receiving the electrical signal generated by said detection assembly.

* * * * *